United States Patent
Nakagawa et al.

(10) Patent No.: US 9,512,301 B2
(45) Date of Patent: Dec. 6, 2016

(54) POLYAMIDE RESIN COMPOSITION REINFORCED WITH GLASS FIBER

(71) Applicant: TOYOBO CO., LTD., Osaka (JP)

(72) Inventors: Tomohide Nakagawa, Shiga (JP); Tatsuya Oi, Shiga (JP); Kazunari Tanaka, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 14/781,366

(22) PCT Filed: Apr. 8, 2014

(86) PCT No.: PCT/JP2014/060143
§ 371 (c)(1),
(2) Date: Sep. 30, 2015

(87) PCT Pub. No.: WO2014/171363
PCT Pub. Date: Oct. 23, 2014

(65) Prior Publication Data
US 2016/0053091 A1 Feb. 25, 2016

(30) Foreign Application Priority Data

| Apr. 16, 2013 | (JP) | 2013-085384 |
| Apr. 16, 2013 | (JP) | 2013-085385 |
| May 9, 2013 | (JP) | 2013-099043 |
| May 9, 2013 | (JP) | 2013-099044 |

(51) Int. Cl.

| C08L 77/00 | (2006.01) |
| B32B 27/30 | (2006.01) |
| B60C 1/00 | (2006.01) |
| C08K 7/14 | (2006.01) |
| C08L 77/02 | (2006.01) |
| C08L 77/06 | (2006.01) |
| C08J 5/04 | (2006.01) |

(52) U.S. Cl.
CPC ............... C08K 7/14 (2013.01); C08J 5/043 (2013.01); C08L 77/02 (2013.01); C08L 77/06 (2013.01); C08J 2377/06 (2013.01); C08J 2377/10 (2013.01); C08J 2477/06 (2013.01); C08J 2477/10 (2013.01)

(58) Field of Classification Search
None
See application file for complete search history.

(56) References Cited

U.S. PATENT DOCUMENTS

| 2011/0263777 A1* | 10/2011 | Nakagawa | C08J 5/043 524/492 |
| 2012/0321829 A1* | 12/2012 | Bayer | C08G 69/36 428/36.9 |

FOREIGN PATENT DOCUMENTS

| JP | 7-118522 | 5/1995 |
| JP | 2003-201398 | 7/2003 |
| JP | 2005-162775 | 6/2005 |
| JP | 2008-95066 | 4/2008 |
| JP | 2010-189467 | 9/2010 |
| JP | 2010-202759 | 9/2010 |
| JP | 2010-254760 | 11/2010 |
| JP | 2012-97181 | 5/2012 |
| JP | 2012-97182 | 5/2012 |
| WO | 2008/068898 | 6/2008 |
| WO | 2012/060392 | 5/2012 |

OTHER PUBLICATIONS

International Search Report issued Jul. 15, 2014 in International (PCT) Application No. PCT/JP2014/060143.
International Preliminary Report on Patentability issued Oct. 20, 2015 in International Application No. PCT/JP2014/060143. (English Translation).

* cited by examiner

Primary Examiner — Susannah Chung
Assistant Examiner — Robert T Butcher
(74) Attorney, Agent, or Firm — Wenderoth, Lind & Ponack, L.L.P.

(57) ABSTRACT

The present invention provides a polyamide resin composition reinforced with glass fiber which can produce a molded product having high anti-vibration property or, in other words, having very high resonance frequency and having, upon necessity, excellent weather-resisting color fastness. A polyamide resin composition reinforced with glass fiber, comprising a polyamide resin (A) constituted from aliphatic polyamide (a1) and aromatic component-containing polyamide (a2), and glass fibers (B) having a cross-sectional area of 1.5 to $5.0 \times 10^{-6}$ cm$^2$, wherein ratio by weight of the polyamide resin (A) to the glass fibers (B) [(A):(B)] is from 20:80 to 35:65 and ratio by weight of the aliphatic polyamide (a1) to the aromatic component-containing polyamide (a2) [(a1):(a2)] is from 5:95 to 95:5. The polyamide resin composition reinforced with glass fibers of the present invention can further comprise carbon black (C) in an amount of at most 5% by weight.

10 Claims, 2 Drawing Sheets

Fig. 1

1. Test piece
2. Vibration output (sensor)
3. Exciter
4. Excited direction

POLYAMIDE RESIN COMPOSITION REINFORCED WITH GLASS FIBER

TECHNICAL FIELD OF THE INVENTION

The present invention relates to a polyamide resin composition reinforced with glass fiber in which specific modulus is raised by addition of glass fibers having a predetermined cross-sectional area to a polyamide resin and, upon necessity, carbon black is further added thereto whereby weather resistance is improved and a very high resonance frequency is achieved. The polyamide resin composition reinforced with glass fiber according to the present invention can be advantageously used as a molded product such as a case for electronic/electric parts and parts for vehicles used for interior and exterior equipments for automobiles such as exterior mirror parts supporting door mirrors. Particularly, it can materialize downsizing of various molded products in a level which cannot be achieved up to now.

BACKGROUND ART

Polyamide resin can express not only high rigidity and high tenacity but also high deflectability under loading when it is reinforced with glass fiber. Therefore, a polyamide resin composition reinforced with glass fiber is widely used as interior and exterior equipments in the fields of electronic/electric devices and automobiles. In recent years, required level of anti-vibration property is becoming high due to a demand for making thickness of the product thin particularly in the field of electronic/electric devices and due to a demand for making size of the vehicle part small. Accordingly, there has been a demand for a thermoplastic resin composition having specific elastic modulus expressed by elastic modulus/specific gravity. In addition, since a molded product of polyamide resin is inferior in weather resistance as compared with a molded product of poly(methyl methacrylate) resin (PMMA), there are many cases wherein weather resistance is imparted to the product during the process after the molding such as coating with paint. Moreover, when the filling amount of glass is 60% by weight or more, weather resistance is significantly deteriorated and it cannot be used particularly as interior and exterior parts for vehicles.

In the Patent Document 1, Nylon 66 base is copolymerized with isophthalamide component which lowers the crystallinity followed by compounding with 60% or more of a reinforcing material such as glass fiber to give a resin composition having an anti-vibration property with high resonance frequency. However, an increase in elastic modulus is not sufficient due to the component which lowers the crystallinity and no good balance between bending elastic modulus and specific gravity for giving the resonance frequency of 200 Hz or more is achieved in a test sample shape. There is also another problem of deterioration of elongation and impact resistance as a result of addition of mica.

In Patent Document 2, there is disclosed a long-fiber polyamide molding material in which polyamide resin is combined with glass roving fibers having a non-circular cross section. However, in Examples of this patent document, glass fibers are not compounded in an amount of 60% or more. Therefore, the ratio of (elastic modulus)/(specific gravity) which is in a proportional relation with resonance frequency is not sufficiently high. As a result, although it is a molding material having high level properties in terms of strength and impact resistance, no sufficient property is expressed so far as anti-vibration property is concerned.

In Patent Document 3, plural resins such as polyamide 6, polyamide 66 and non-crystalline polyamide are used not by means of copolymerization but by means of a blended base, then a reinforcing material is highly filled while the crystallinity is still kept and, further, polypropylene is added thereto in an optimum amount whereupon high resonance frequency is achieved and, at the same time, attenuation property is also imparted. However, as to the current demand for the anti-vibration, resonance frequency of 230 Hz or more is required in the test method of Patent Document 3. When a resin expressing low elastic modulus such as polypropylene is used as a component, it is absolutely impossible to reach the requirement. Accordingly, there has been a demand for a combination of glass fibers with thermoplastic resin which can express higher specific elastic modulus.

In Patent Document 4, there is disclosed a composition showing good weather resistance by addition of inorganic filler, stabilizer and carbon black to a mixed base of aliphatic polyamide with semi-aromatic polyamide. However, adding amount of the inorganic filler is still limited to an extent of 60% by weight and, in Examples, adding amount of the inorganic filler is also in about 50% by weight. Accordingly, in the composition of the Patent Document 4, high anti-vibration property and weather resistance are not compatible.

PRIOR ART DOCUMENTS

Patent Documents

Patent Document 1: Japanese Patent Application Laid-Open (JP-A) No. 118522/95
Patent Document 2: Japanese Patent Application Laid-Open (JP-A) No. 2008-95066
Patent Document 3: Japanese Patent Application Laid-Open (JP-A) No. 2005-162775
Patent Document 4: Japanese Patent Application Laid-Open (JP-A) No. 2010-189467

DISCLOSURE OF THE INVENTION

Problem that the Invention is to Solve

The present invention has been created in view of the current status of the above-mentioned prior art and its object is to provide a polyamide resin composition reinforced with glass fiber which can produce a molded product having high anti-vibration property or, in other words, having very high resonance frequency and having, upon necessity, excellent weather-resisting color fastness.

Means for Solving the Problem

The present inventors have eagerly investigated for achieving such an object and, as a result, they have found that, when glass fibers having a cross section of specific shape are added to polyamide resin, expression of elastic modulus becomes to be maximum against the specific gravity thereof. Further, they have found that, when the fiber numbers and glass fiber surface area are decreased as compared with those of the commonly used glass fibers having cross-sectional area of $9.5 \times 10^{-7}$ cm$^2$ (glass fiber diameter: 11 μm) and glass fibers having cross-sectional area of $13.3 \times 10^{-6}$ cm$^2$ (glass fiber diameter: 13 μm), the production is now possible by addition of carbon black and stabilizer, using a biaxial extruder, in a satisfactory amount for imparting weather resistance in spite of highly filled amount of glass or that, to be more specific, when the polyamide resin composition reinforced with glass fiber as such is used, a molded product having satisfactory bending property and weather resistance can be prepared and accordingly that the product not only has high resonance frequency which has been unable to be achieved in the prior art but also has excellent strength, impact resistance and weather resistance. As a result, the present invention has been accomplished.

Thus, the present invention adopts the following constitutions (1) to (11).

(1) A polyamide resin composition reinforced with glass fiber, comprising a polyamide resin (A) constituted from aliphatic polyamide (a1) and aromatic component-containing polyamide (a2), and glass fibers (B) having a cross-sectional area of 1.5 to $5.0 \times 10^{-6}$ cm$^2$, wherein ratio by weight of the polyamide resin (A) to the glass fibers (B) [(A):(B)] is from 20:80 to 35:65 and ratio by weight of the aliphatic polyamide (a1) to the aromatic component-containing polyamide (a2) [(a1):(a2)] is from 5:95 to 95:5.

(2) The polyamide resin composition reinforced with glass fiber according to (1), wherein the composition further comprises carbon black (C) in an amount of at most 5% by weight.

(3) The polyamide resin composition reinforced with glass fiber according to (1) or (2), wherein the aromatic component-containing polyamide (a2) is crystalline polyamide and the ratio by weight of (a1) to (a2) [(a1):(a2)] is from 5:95 to 75:25.

(4) The polyamide resin composition reinforced with glass fiber according to any of (1) to (3), wherein the aromatic component-containing polyamide (a2) contains poly-m-xylylene adipamide which has relative viscosity in 96% sulfuric acid solution of 1.4 to 1.8 and has terminal carboxyl group concentration of not higher than 50 meq/kg.

(5) The polyamide resin composition reinforced with glass fiber according to (1) or (2), wherein the aromatic component-containing polyamide (a2) is noncrystalline polyamide and the ratio by weight of (a1) to (a2) [(a1):(a2)] is from 60:40 to 95:5.

(6) The polyamide resin composition reinforced with glass fiber according to any of (1) to (5), wherein a part of or all of the glass fibers (B) is/are glass fibers having a flat cross section, wherein the glass fibers having a flat cross section consist of glass fibers (B-1) having a flat cross section and having ratio of short diameter to long diameter of from 0.3 to 0.5 and glass fibers (B-2) having a flat cross section and having ratio of short diameter to long diameter of from 0.2 to 0.3, and wherein ratio by weight thereof [(B-1):(B-2)] is from 0:100 to 100:0.

(7) The polyamide resin composition reinforced with glass fiber according to any of (1) to (6), wherein the composition further comprises a copper compound (D) in an amount of at most 0.5% by weight.

(8) The polyamide resin composition reinforced with glass fiber according to any of (1) to (7), wherein the composition further comprises an additive component (E) containing mold-releasing agent, stabilizer and/or coupling agent in an amount of at most 5% by weight.

(9) A molded product formed of the polyamide resin composition reinforced with glass fiber according to any of (1) to (8), wherein specific gravity $\rho$ (g/cm$^3$) of the molded product and bending elastic modulus E (GPa) of the molded product satisfy formulae: $11 < E/\rho < 18$ and $1.7 < \rho < 2.0$.

(10) The molded product according to (9), wherein weight-average length of the residual glass fibers in the molded product is 260 to 1000 μm.

(11) The molded product according to (9) or (10), wherein the molded product is used for interior equipment or for exterior equipment of electronic/electric cases or vehicles.

Advantages of the Invention

In the polyamide resin composition reinforced with glass fiber according to the present invention, cross-sectional area of the glass fibers to be added thereto is stipulated to a specific range whereby expression of elastic modulus against specific gravity can be controlled in an area wherein glass is highly filled and, in addition, even when carbon black is sufficiently added in the composition having glass fiber content of 65% by weight or more, granulation of pellets by a biaxial extruder can be still easily carried out. As a result, the polyamide resin composition reinforced with glass fiber of the present invention can afford high resonance frequency and also has high strength, impact resistance and weather-resisting color fastness whereby it is very suitable as cases of electronic/electric instruments and as parts used for interior and exterior equipments for automobiles.

BEST MODE FOR CARRYING OUT THE INVENTION

The polyamide resin composition reinforced with glass fiber according to the present invention comprises a polyamide resin (A) constituted from aliphatic polyamide (a1) and aromatic component-containing polyamide (a2), and glass fibers (B) having a cross-sectional area of 1.5 to $5.0 \times 10^{-6}$ cm$^2$, as well as carbon black (C) upon necessity. In the polyamide resin composition reinforced with glass fiber according to the present invention, the above (A) and (B) or the above (A), (B) and (C) are the main constituents. It is preferred that their total amount occupies 95% by weight or more.

With regard to the polyamide resin (A), it is preferred that a part thereof is crystalline resin in view of expression of bending elastic modulus against specific gravity when the glass fibers are added and, in addition, it is preferred that the ratio of the crystalline polyamide resin is high (such as 50% by weight or more). The polyamide resin (A) is a polyamide resin produced by polycondensation of lactam, ω-aminocarboxylic acid, dicarboxylic acid, diamine, etc. as the materials or is a copolymerized product or a blended product thereof. Examples of lactam and ω-aminocarboxylic acid include ε-caprolactam, 6-aminocaproic acid, ω-enantolactam, 7-aminoheptanoic acid, 11-aminoundecanoic acid, 9-aminononanoic acid, α-pyrrolidone and α-piperidine. Examples of the dicarboxylic acid include terephthalic acid, isophthalic acid, adipic acid and sebacic acid. Examples of the diamine include tetramethylenediamine, hexamethylenediamine, m-xylylenediamine, p-xylylenediamine, undecamethylenediamine, dodecamethylenediamine, 2-methylpentamethylenediamine, trimethylhexamethylenediamine, aminoethylpiperazine and bisaminomethylcyclohexane.

In order to satisfy that the polyamide resin (A) has high bending elastic modulus and high impact resistance at the same time, it is necessary to use the aliphatic polyamide (a1) and the aromatic component-containing polyamide (a2) by mixing them in a ratio by weight of (a1):(a2)=5:95 to 95:5. It is preferred that the polyamide resin for injection molding has crystallinity of more than a predetermined degree. Therefore, the ratio by weight of (a1):(a2) is preferably from 5:95 to 75:25, more preferably from 15:85 to 70:30, and most preferably from 20:80 to 65:35 in view of molding property and heat resistance when the aromatic component-containing polyamide (a2) is crystalline. In the meantime, when the aromatic component-containing polyamide (a2) is noncrystalline, the ratio by weight of (a1):(a2) is preferably from 60:40 to 95:5, and more preferably from 60:40 to 90:10 in view of the molding property and the productivity.

With regard to the aromatic component-containing polyamide (a2), preferred one is a polyamide resin which expresses high elastic modulus, adjusts solidifying speed and improves strand property during the production and metal die transfer property during the injection molding. With regard to the aromatic component-containing polyamide (a2), examples thereof include polyamide 6T /6I produced from terephthalic acid, isophthalic acid and adipic acid, polyamide 6T/66 produced from terephthalic acid, adipic acid and hexamethylenediamine and polyamide MXD6 (poly-m-xylylene adipamide) produced from m-xylylenediamine and adipic acid. Considering compatibility, strength-expressing property, tenacity-holding property and rigidity-expressing property when the polyamide (a1) and the polyamide (a2) are used together, polyamide MXD6 is preferred. When a crystalline polyamide such as MDX6 which contains xylylenediamine as a component is used as a main component, it is particularly preferred to use, as a part of (a2), m-xylyleneadipamine having relative viscosity in 96% sulfuric acid solution of 1.4 to 1.8. Although m-xylyleneadipamide having relative viscosity of 1.4 to 1.8 has good fluidity, it is very fragile and also has low impact strength whereby its reaction with a silane coupling agent on the glass fiber surface is not preferred. Accordingly, when m-xylyleneadipamide having relative viscosity of 1.4 to 1.8 is used, preferred manner is to use m-xylyenadipamide having relative viscosity of 1.4 to 1.8 and having terminal carboxyl group concentration of not more than 50 meq/kg in such an adding amount that terminal carboxyl group concentration (CEG: meq/kg) of the whole polyamide resin (A) satisfies the range of 10 to 95 meq/kg so that no reaction with the coupling agent takes place.

Polyamide 6, polyamide 66, polyamide 46, etc. are preferred as the aliphatic polyamide (a1) in view of molding property, heat resistance, tenacity, rigidity, etc. When the aromatic component-containing polyamide (a2) is noncrystalline, the aliphatic polyamide (a1) is preferred to contain polycaproamide which has relative viscosity in 96% sulfuric acid solution of 1.4 to 2.0 and has terminal carboxyl group concentration of 55 to 95 meq/kg. As a result, it is now possible to enhance productivity in highly filling the glass fibers having a flat cross section and fluidity of the resin composition during molding and to improve appearance of the molded product while tenacity in some degree still can be maintained.

Polyamide 6, polyamide 66, polyamide 46, polyamide MXD6, polyamide 6T/6, polyamide 6T/66, and a blended product thereof are preferred as the polyamide resin (A) in view of molding property, heat resistance, tenacity, rigidity, etc. For satisfying high bending elastic modulus, it is particularly preferred that polyamide MXD6 is used as a main component (preferably 50% by weight or more) and polyamide 6 or polyamide 66 is blended therewith.

For achieving an efficient reaction of the polyamide resin (A) with a polyamide-reactive silane coupling agent (C) provided on glass fibers by surface treatment, molecular terminal of the polyamide (A) has carboxyl group or amino group. To be more specific, terminal carboxyl group concentration (CEG: meq/kg) of the polyamide resin (A) is preferred to be 10 to 95 meq/kg and more preferred to be 55 to 90 meq/kg. Although poly-m-xylyleneadipamide having relative viscosity in 96% sulfuric acid solution of 1.4 to 1.8 is good in terms of fluidity, it is very fragile and its impact strength is also low. Accordingly, it is preferred that, when this poly-m-xylyleneadipamide is contained, terminal carboxyl group concentration is not more than 50 meq/kg so that no coupling with the glass fibers takes place.

In the polyamide resin composition reinforced with glass fiber according to the present invention, it is necessary that the ratio by weight of the polyamide resin (A) to the glass fibers (B) [(A):(B)] is from 20:80 to 35:65. As a result thereof, in the molded product formed of the polyamide resin composition reinforced with glass fiber according to the present invention, its specific gravity $\rho$ (g/cm$^3$) and bending elastic modulus E (GPa) can satisfy formulae: $11<E/\rho<18$ and $1.7<\rho<2.0$. When the ratio by weight of the glass fibers (B) is lower than the above range, the above value of $E/\rho$ may become less than 1.7 whereby sufficiently high resonance frequency cannot be achieved. When the ratio by weight of the glass fibers (B) is higher than the above range, the ratio of the glass fibers (B) becomes too high whereby efficient production of the molded product is not possible and, moreover, defect is resulted in the interface between the glass fibers (B) and the polyamide resin whereby sufficient strength and impact resistance cannot be achieved.

It is preferred to use glass fibers having a flat cross section in a part of (for example, 50% by weight or more of) or all of the glass fibers (B). A glass fiber having a flat cross section includes a one wherein cross section being vertical to the lengthwise direction of the fiber is nearly elliptic, nearly long circular or nearly cocoon shape, and flatness degree thereof is preferably 1.5 to 8 and more preferably 2 to 5. Here, the term "flatness degree" is ratio of long diameter to short diameter when a rectangle with the smallest area contacting outside of the cross section vertical to the lengthwise direction of the glass fiber is supposed and length of long side of this rectangle is named the long diameter and length of short side thereof is named the short diameter. When the flatness degree is less than the above range, there is no big difference in terms of the shape from the glass fiber having a circular cross section and, therefore, there are some cases wherein impact resistance of the molding product is not so much enhanced. On the other hand, when the flatness degree is more than the above range, bulk density in the polyamide resin is high and, therefore, there are some cases wherein uniform dispersing in the polyamide is not achieved and there are also some cases wherein impact resistance of the molded product is not so much enhanced. In the present invention, the glass fiber having a nearly long circular cross section whose flatness degree is 2 to 5 is particularly preferred since it expresses high mechanical property. In the present invention, it is necessary that the glass fibers (B) are limited to those having thickness range of 1.5 to $5.0 \times 10^{-6}$ cm$^2$ in terms of the cross-sectional area regardless of shape of the cross section. A glass fiber which has been commonly used up to now having a round cross section of 11 μm or 13 μm diameter is not preferred since properties cannot be efficiently expressed in a highly filled region of 65% by weight or more. When glass fibers having a flat cross section are used in a part of or in all of the glass fibers, it is preferable to use glass fibers (B-1) having a flat cross section and having ratio of short diameter to long diameter of from 0.3 to 0.5 and glass fibers (B-2) having a flat cross section and having said ratio of from 0.2 to 0.3 together in ratio of (B-1) to (B-2) from 0:100 to 100:0, more preferably from 10:90 to 90:10. As a result, it is possible to control warpage, shrinkage and value of (bending elastic modulus):(specific gravity) of the molded product and it is also possible that carbon black or stabilizer which is an additive necessary for improving the weather resistance is sufficiently added.

When the glass fibers (B) are added to the polyamide resin (A) in the present invention, it is important to prepare pellets of a polyamide resin composition which express higher bending elastic modulus against specific gravity. For such a purpose, it is necessary to use glass fibers having small glass fiber numbers and having cross-sectional area within a specific range wherein interference among the glass fibers is small. In that case, the cross-sectional area of the glass fibers (B) necessary therefor is 1.5 to $5.0 \times 10^{-6}$ $cm^2$. When the cross-sectional area of the glass fibers is less than that range, not only the fiber numbers per unit weight becomes large but also each single fiber is apt to be bent whereby it is not possible to prepare pellets wherein fiber length is kept effective in a highly filled rate in granulation of the pellets using a biaxial extruder.

With regard to the glass fibers (B), those in various cross-sectional shape may be applied. It is preferred that glass fibers used for a purpose of increasing expression of elastic modulus against specific gravity include those which has a flat cross-sectional shape in such views that the glass fibers are hardly bent upon pellet production, that expression of properties is large due to a large glass fiber surface area and that warping and deformation of a molded product can be suppressed. Further, when two or more kinds of glass fibers (B) having a flat cross section in different (long diameter)/(short diameter) ratios are used upon kneading with the polyamide resin (A), it is possible to disarrange the resin-flowing pattern and to suppress a quick resin flow from a specific orifice of an extruder. As a result thereof, productivity in a production method wherein pellets are granulated by biaxial extrusion and also by strand cutting becomes significantly good and it is possible to efficiently prepare pellets in such a composition ratio which expresses high bending elastic modulus against specific gravity.

In preparing a polyamide resin composition reinforced with glass fiber according to the present invention, it is preferred that a polyamide-reactive silane coupling agent is added in an amount of 0.1 to 1.0% by weight of glass fibers (B) to a mixture consisting of polyamide resin (A) and glass fibers (B), particularly when glass fibers having a flat cross section are used as glass fibers (B). As to a converging agent for chop strand for the polyamide, a small amount of a silane coupling agent is previously contained in a fiber bundle in order to improve adhesive property to a matrix resin. However, since there is an upper limit for the amount of the amino silane coupling agent which can be previously added to the fiber bundle so as to avoid poor opening of the fiber bundle during the extrusion, the shortfall is preferred to be further added separately.

With regard to carbon black (C), it may be added in an amount of at most 5% by weight for greatly improving the weather-resisting color fastness in a black molded product. The carbon black produced by a furnace method which is a main stream at present is called "furnace black" and is distinguished from carbon black produced by other methods. The furnace method for the furnace black is a method for the production of carbon black wherein oil of petroleum type or coal type as a material is blown into high-temperature gas followed by subjecting to incomplete combustion to produce the carbon black. Since the furnace method is suitable for mass production due to its high yield and since the furnace method also can control particle size, structure, etc. broadly, the furnace method has been most frequently used for the production of carbon black for various uses from reinforcement of rubber to coloration. On the other hand, a channel method for channel black is a method wherein natural gas is mostly used as a material, flame in incomplete combustion is made to contact with channel steel (steal in H type) and the carbon black separated out therefrom is scraped and collected. Since there is a problem therein in view of yield and environment, the furnace method is a main stream as a mass-production process. An acetylene method for acetylene black is a method wherein carbon black is prepared by thermal decomposition of acetylene gas. Since the carbon black prepared thereby has high structure and high crystallinity, it is used mostly as an agent for imparting electric conductivity. Lamp smoke black (lamp black) is prepared by a method wherein carbon black is recovered as soot from the smoke generated by burning of oil or pine and this method has been continued since the era of before Christ. Although the method is not suitable for mass production, it gives carbon black having specific color tone whereby it has been used for the production of a material for black ink sticks, etc. As to the carbon black (C) used in the present invention, any of the above-produced ones may be acceptable but, when selection is done in view of cost, carbon black produced by a furnace method is preferred. Content of the carbon black (C) in the polyamide resin composition of the present invention is preferred to be 0.5 to 5% by weight, more preferred to be 0.6 to 5% by weight, and further preferred to be 1.0 to 4.0% by weight.

With regard to the polyamide resin composition reinforced with glass fiber according to the present invention, its heat resistance can be improved when it contains a copper compound (D) in an amount of at most 0.5% by weight, preferably in an amount of at least 0.01% by weight and at most 0.4% by weight. When the copper compound (D) is less than 0.01% by weight, retention rate of the bending strength at 180° C. for 2000 hours is still in low values and there is a possibility that resistance to aging upon heating cannot be improved. On the other hand, even when more than 0.5% by weight is added, the resistance to aging upon heating is not improved further but there is a possibility that physical properties lower. Specific examples of the copper compound are copper chloride, copper bromide, copper iodide, copper acetate, copper acetylacetonate, copper carbonate, copper borofluoride, copper citrate, copper hydroxide, copper nitrate, copper sulfate and copper oxalate. It is also possible in the present invention to add a stabilizer as other additive component (E) such as an alkali halide compound in a manner of joint use with the copper compound. Examples of such an alkali halide compound are lithium bromide, lithium iodide, potassium bromide, potassium iodide, sodium bromide and sodium iodide and a particularly preferred one is potassium iodide.

Moreover, in the polyamide resin composition reinforced with glass fiber according to the present invention, a mixture of polyamide resin (A), glass fibers (B) and, if necessary, carbon black (C) and copper compound (D) may be compounded with other additive component (E) in an amount of at most 5% by weight such as the above stabilizer, the above coupling agent, inorganic filler, phenol-type antioxidant and phosphorus-type antioxidant as a stabilizer to light or heat, mold-releasing agent, crystal nucleus agent, lubricant, flame retardant, antistatic agent, pigment, dye, etc. within such an extent that it does not deteriorate the characteristic feature of the present invention. The additive component also includes a master base (resin) component when each of the above components is used as a master batch.

There is no particular limitation for the method of producing the polyamide resin composition reinforced with glass fiber of the present invention and each of the components is melted and kneaded by the conventionally known kneading method to give the composition. There is also no limitation for a specific kneading apparatus. Although uniaxial or biaxial extruder, kneading machine, kneader, etc. may be exemplified, a biaxial extruder is particularly preferred in view of productivity. Although there is also no particular limitation for a screw arrangement, it is preferred to provide a kneading zone so that each of the components is more uniformly dispersed. As to a specific method therefor, there is exemplified a method wherein polyamide resin (A) is preblended together, if necessary, with carbon black (C), copper compound (D) and other additive component (E) using a blender and poured into a uniaxial or biaxial extruder from a hopper, then glass fibers (B) are poured into a melted mixture in the uniaxial or biaxial kneader using a feeder under a state wherein at least a part of (A) is melted and, after the melting and kneading thereof, it is blown out into a strand form followed by cooling and cutting.

In a molded product of the polyamide resin composition reinforced with glass fiber according to the present invention prepared as mentioned above, specific gravity $\rho$ (g/cm$^3$) and bending elastic modulus E (GPa) of the molded product can satisfy formulae: $11<E/\rho<18$ and $1.7<\rho<2.0$ when the specific polyamide resin (A) and the glass fibers (B) having a specific cross-sectional area are used whereupon good anti-vibration property and very high bending strength and impact resistance can be achieved.

In the polyamide resin composition reinforced with glass fiber according to the present invention, weight-average length of the residual glass fibers in the molded product is preferred to be 260 to 1000 µm. Measurement of the residual glass fiber length is conducted as follows. Thus, in a material wherein the glass fibers are highly filled, there is much interference among the glass fibers each other whereby the glass fibers are apt to be broken upon the measurement and correct fiber length is hardly determined. Therefore, in order to correctly measure the glass fiber length in the present invention, pellets prepared by melting and kneading are strongly heated at 650° C. for 2 hours so that the glass fibers are taken out as ash without breaking the glass fibers and the resulting glass fibers are dipped in water and dispersed therein using a commonly used ultrasonic washing machine. The dispersed glass fibers are then taken out onto a preparation for observation under a microscope and observed under a digital microscope (KH-7700 manufactured by Hirox Co., Ltd.) with 80 magnifications and the fiber length in terms of weight-average is determined and adopted as the residual glass fiber length. Incidentally, there is no particular limitation for the shape of pellets so far as it is a generally resulting shape. Thus, its cross section is any of, for example, circular, elliptic and long circular ones and its diameter (both in terms of short and long ones) is 2.0 to 4.0 mm while the pellet length is about 2.5 to 6.0 mm. With regard to the condition for making into pellets, there is no particular limitation provided that it is a general condition. For example, a method mentioned in Examples which will be mentioned later will be exemplified.

Resonance frequency F(0) is in a relation of $F(0) \propto k(E/\rho)^{(1/2)}$, wherein E means elastic modulus (MPa) and $\rho$ means specific gravity (g/cm$^3$). Thus resonance frequency F(0) is in a proportional relation to a root of X value given as $X=E/\rho$. Thus, in a composition constitution having rather high bending elastic modulus for its specific gravity, the resonance frequency in the molded product thereof becomes higher whereby anti-vibration property can be said to be improved. In the conventional composition constitution wherein mainly injection molding is a prerequisite, glass fiber diameter of 6.5 to 13 µm has been said to be optimum for making strength and impact expression higher in relation to the adding amount of glass fibers. Thus, with regard to the cross-sectional area, the glass fiber diameter of $3.3\times10^{-7}$ cm$^2$ to $1.34\times10^{-6}$ cm$^2$ has been designed to be optimum. Due to its small diameter, upper limit of the filling amount of the glass fibers of such a cross-sectional area into a polyamide resin composition has been less than 65% by weight and, with regard to X value wherein resonance frequency is proportional to its root as shown by the present invention, it has been within a range of $X<11$. Within such a range, sufficiently high resonance frequency cannot be achieved. The present invention uses thicker glass fibers or, in other words, glass fibers having the cross-sectional area of 1.5 to $5.0\times10^{-6}$ cm$^2$ in order to prepare pellets of resin composition reinforced with glass fiber which are used for injection molding and which can express higher resonance frequency. Moreover, a predetermined amount or more of carbon black is added when weather resistance is to be imparted. When glass fibers having the conventional cross-sectional area are used, it is very difficult to conduct a granulation of pellets containing 65% by weight or more of glass fibers and carbon black by means of a biaxial extruder. The molded product formed of the resin composition of the present invention achieves good anti-vibration and weather resisting properties by taking those into consideration. With regard to weather resistance of the molded product formed of the resin composition of the present invention using carbon black, color difference ΔE between a molded product subjected to a treatment at 83° C. without raining wherein irradiation degree, irradiation wavelength and irradiation time are 500±50 W/m$^2$, 300 to 700 nanometers and 400 hours, respectively using an ultraviolet fadeometer and a molded product without such a treatment can be less than 1.5.

EXAMPLES

The present invention will now be illustrated in more detail as hereunder by Examples although the present invention is not limited to the following Examples so far as it does not exceed the gist thereof. Measurement of the physical data in the Examples was carried out in accordance with the following methods.

(1) Relative Viscosity of the Polyamide Resin:

The polyamide resin (0.25 g) was dissolved in 25 ml of 96 wt % sulfuric acid, 10 ml of the resulting solution was placed in an Oswald viscometer, measurement was conducted at 20° C. and calculation was done according to the following formula.

$$RV=T/T0$$

RV: Relative viscosity, T: Dropping time of the sample solution, T0: Dropping time of the solvent (2) Concentration of Terminal Carboxyl Group in the Polyamide Resin (CEG):

To 0.2 g of the polyamide resin was added 10 ml of benzyl alcohol followed by dissolving at 180±5° C. for 5 minutes. The resulting solution was cooled for 15 second in water and titrated with an ethanolic potassium hydroxide solution (prepared by adding ethanol to 80 ml of 0.5N KOH to adjust the volume to a 1000 ml solution) using phenolphthalein as an indicator and calculation was conducted according to the following formula.

$$CEG \text{ (meq/kg)} = \{[(A-B) \times N \times f]/(W \times 1000)\} \times 10^6$$

A: Titrated amount (ml)
B: Blank titrated amount for the solvent (ml)
N: Concentration of ethanolic potassium hydroxide (mol/l)
f: Factor of ethanolic potassium hydroxide
W: Weight of the polyamide resin (g)

(3) Bending Strength, Bending Elastic Modulus:

These parameters were measured in accordance with ISO 178.

(4) Charpy Impact Strength:

This parameter was measured in accordance with ISO 179-1. As a test piece shape, 1 eA (cut notch portion) was used.

(5) Residual Glass Fiber Length:

The residual glass fiber length in the molded product was measured by the following methods.

Thus, in a material wherein the glass fibers are highly filled, there is much interference among the glass fibers each other whereby the glass fibers are apt to be broken upon the measurement and correct fiber length is hardly determined. Therefore, in order to correctly measure the glass fiber length in the present invention, molded products which have been molded, for bending test, from pellets prepared by melting and kneading were strongly heated at 650° C. for 2 hours so that the glass fibers are taken out as ash without breaking the glass fibers and the resulting glass fibers were dipped in water. The dispersed glass fibers were then taken out onto a preparation for observation under a microscope and observed under a digital microscope (KH-7700 manufactured by Hirox Co., Ltd.) with 80 magnifications and the fiber length in terms of weight-average was determined and adopted as the residual glass fiber length.

(6) Specific Gravity:

Specific gravity was measured in accordance with JIS-Z8807.

Figure 1:
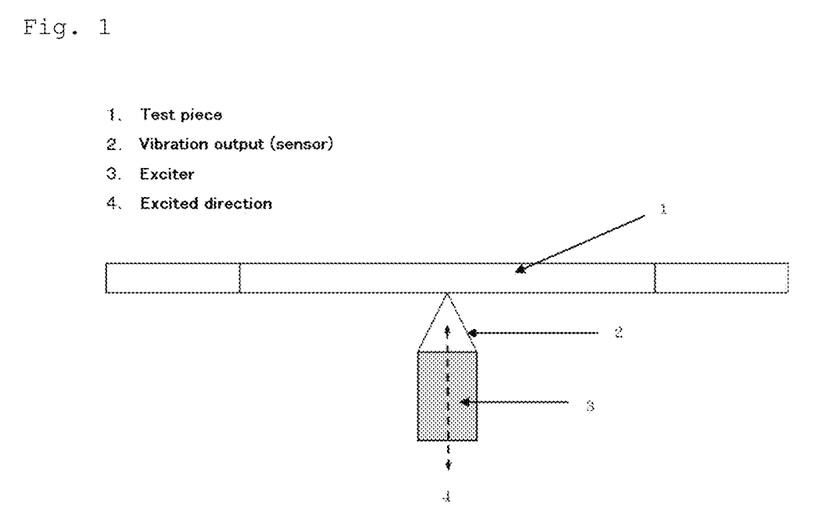
FIG. 1 is a brief drawing of a vibration test apparatus for evaluating resonance frequency.

(7) Resonance Frequency:

A vibration test was conducted by a central exciting method using an ISO tensile dumbbell test piece by referring to ISO 6721-1 (cf. FIG. 1). Central area of the test piece was fixed to an exciter, vibration was applied thereto from the exciter in an atmosphere of 23° C. and 50% RH and the acceleration response was subjected to Fourier conversion according to ISO 6721-1 to calculate a frequency-responding function whereby resonance frequency was determined.

(8) Productivity:

The case wherein production was possible was marked "o" while the case wherein a strand was often cut upon pulling the strand from an extruder whereby the production was not possible at all was marked "x".

(9) Weather Resistance:

A molded product was subjected to a treatment at 83° C. without raining wherein irradiation degree, irradiation wavelength and irradiation time are 500±50 W/m$^2$, 300 to 700 nanometers and 400 hours, respectively using an ultraviolet fadeometer. After that, measurement of color difference was conducted by a reflection method according to the method stipulated by JIS Z 8722. The difference ΔE from the molded product which was not subjected to the above treatment by an ultraviolet fadeometer was adopted as an index for the evaluation. As an ultraviolet fadeometer, type U48AUHBBR manufactured by Suga Shikenki KK was used while, as a measuring device, SC-T45 manufactured by Suga Shikenki KK was used.

Polyamide (A) used:

(a1A) Polyamide 6 having relative viscosity RV of 1.9; "Nylon T-860" manufactured by Toyobo; concentration of terminal carboxyl group (CEG: unit meq/kg)=80

(a1B) Polyamide 66 having relative viscosity RV of 2.4; "Stabamide 23AE" manufactured by Rhodia; CEG=91

(a2A) Polyamide MXD6 having relative viscosity RV of 2.1; "Nylon T 600" manufactured by Toyobo; CEG=65; crystalline polyamide (a2B) Polyamide MXD6 having relative viscosity RV of 1.7; "Nylon T 640" manufactured by Toyobo; CEG=35; crystalline polyamide (a2C) Polyamide 6T6I having relative viscosity RV of 2.0; "Glyboly G21" manufactured by Ems; CEG=87; non-crystalline polyamide Glass fibers (B) used:

(b1) "CSG3PA810S" manufactured by Nittobo as a chop strand of glass fiber having a flat cross section; flatness degree: 4.0 (ratio of short diameter to long diameter=0.25); short diameter: 7 μm; fiber length: 3 mm; cross-sectional area=1.67×10$^{-6}$ cm$^2$ to 1.96×10$^{-6}$ cm$^2$ (b2) "CSG3PL810S" manufactured by Nittobo as a chop strand of glass fiber having a flat cross section; flatness degree: 2.5 (ratio of short diameter to long diameter=0.4); short diameter: 9 μm; fiber length: 3 mm; cross-sectional area=1.72×10$^{-6}$ cm$^2$ to 2.03×10$^{-6}$ cm$^2$ (b3) "T-275N" manufactured by Nippon Electric Glass Co., Ltd. as a chop strand of glass fiber having a circular cross section; diameter: 17 μm; fiber length: 3 mm; cross-sectional area=about 2.27×10$^{-6}$ cm$^2$ (b4) "T-275H" manufactured by Nippon Electric Glass Co., Ltd. as a chop strand of glass fiber having a circular cross section; diameter: 11 μm; fiber length: 3 mm; cross-sectional area=about 9.50×10$^{-7}$ cm$^2$ Carbon black (C) used:

(C) Master batch of carbon black (c1) Master batch of carbon black: "EPC8E313" manufactured by SUMIKA COLOR CO., LTD., master base=LDPE resin, containing 45% by weight of carbon black, furnace black (c2) Master batch of carbon black: "ABF-T-9801" manufactured by Resino Color, master base=AS resin, containing 45% by weight of carbon black, furnace black Copper compound (D) used:

(d1) Copper bromide (II)

Other additive components (E) used:

Mold-releasing agent: Montanate wax "WE 40" manufactured by Clariant

Stabilizer: potassium iodide

Coupling agent: "KBE 903" manufactured by Shin-Etsu Chemical Co., Ltd. as an aminosilane coupling agent Examples 1 to 10 and Comparative Examples 1 to 10

Figure 2:
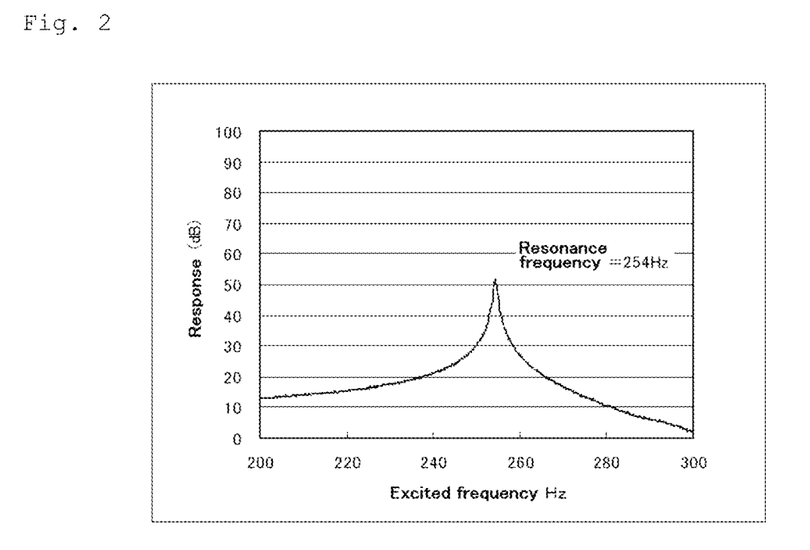
FIG. 2 is a graph showing the result of evaluation of resonance frequency in Example 1.
Figure 3:
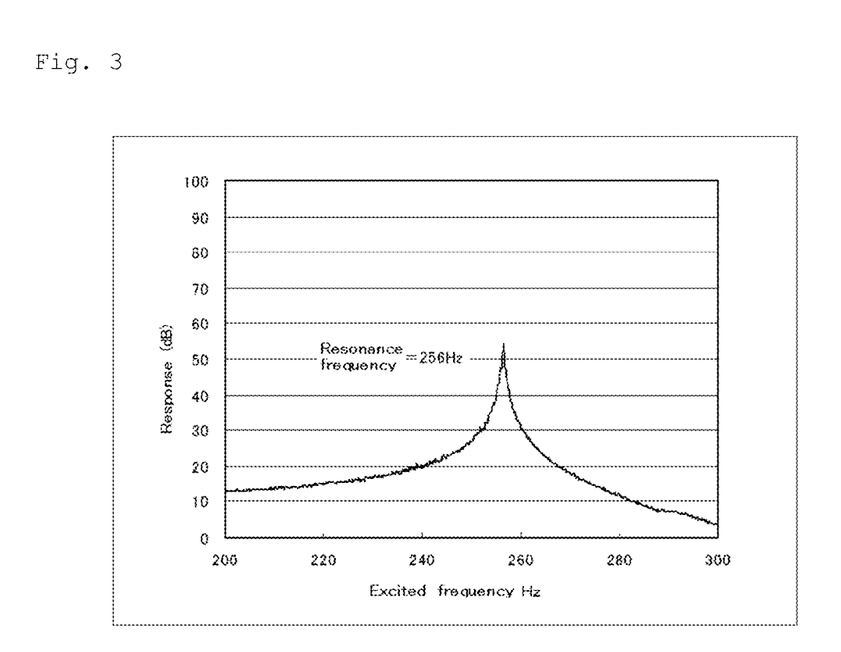
FIG. 3 is a graph showing the result of evaluation of resonance frequency in Example 6.

Components other than the glass fibers (B) were subjected to dry blending under the compounding ratios as shown in Tables 1 and 2 and subjected to the melt mixing under the extruding condition wherein the cylinder temperature was 280° C. and the screw revolution was 250 rpm using a biaxial extruder "STS 35 mm" (constituted from 12 blocks of barrel) which was a biaxial extruder of a bent type manufactured by Coperion and, after that, the glass fibers (B) were fed by a side feeding system to conduct a melt kneading. Strand extruded from the extruder was quickly cooled and made into pellets using a strand cutter. Incidentally, there is no particular limitation for the shape of pellets so far as it is a generally resulting shape. Thus, its cross section is any of, for example, circular, elliptic and long circular ones and its diameter (both in terms of short and long ones) is 2.0 to 4.0 mm while the pellet length is about 2.5 to 6.0 mm. With regard to the condition for making into pellets, there is no particular limitation provided that it is a general condition. The resulting pellets were dried at 100° C. for 12 hours, then molded into test pieces for various tests using an injection molding machine (IS 80 manufactured by Toshiba Machine Co., Ltd.) at the cylinder temperature of 280° C. and the metal mold temperature of 80° C. or, if necessary for crystallization, at the metal mold temperature of 140° C. The resulting test pieces were subjected to the evaluation. Result of the evaluation is also mentioned in Tables 1 and 2. Incidentally, graphs of the result of the evaluation for resonance frequency of the test pieces of Examples 1 and 6 are also shown in FIGS. 2 and 3, respectively.

TABLE 1

| | | | | Example 1 | Example 2 | Example 3 | Example 4 | Example 5 |
|---|---|---|---|---|---|---|---|---|
| (A) | a1A | Polyamide 6 (RV = 1.9, CEG = 80) | parts by weight | | | | | 17 |
| | a1B | Polyamide 66 (RV = 2.4, CEG = 91) | parts by weight | 3 | 3 | 5 | 3 | 5 |
| | a2A | Polyamide MXD6 (crystalline, RV = 2.1, CEG = 65) | parts by weight | 5 | 2 | 10 | 5 | |
| | a2B | Polyamide MXD6 (crystalline, RV = 1.7, CEG = 35) | parts by weight | 22 | 20 | 10 | 22 | |
| | a2C | Polyamide 6T6I (noncrystalline, RV = 2.0, CEG = 87) | parts by weight | | | | | 8 |
| (B) | b1 | Glass fiber having a flat cross section (flatness degree: 4.0) (cross-sectional area = $1.67 \times 10^{-6}$ to $1.96 \times 10^{-6}$ cm$^2$) | parts by weight | 70 | 75 | 45 | | 30 |
| | b2 | Glass fiber having a flat cross section (flatness degree: 2.5) (cross-sectional area = $1.72 \times 10^{-6}$ to $2.03 \times 10^{-6}$ cm$^2$) | parts by weight | | | | 30 | 30 |
| | b3 | Glass fiber having a circular cross section (cross-sectional area = about $2.27 \times 10^{-6}$ cm$^2$) | parts by weight | | | | 70 | 10 |
| | b4 | Glass fiber having a circular cross section (cross-sectional area = about $9.50 \times 10^{-7}$ cm$^2$) | parts by weight | | | | | |
| (D) | d1 | Copper bromide | parts by weight | 0.02 | | | | |
| (E) | | Mold-releasing agent | parts by weight | 0.3 | 0.3 | 0.3 | 0.3 | 0.3 |
| | | Stabilizer | parts by weight | 0.1 | 0.1 | 0.1 | 0.1 | 0.1 |
| | | Coupling agent | parts by weight | 0.2 | 0.2 | 0.2 | 0.2 | 0.2 |
| Properties of molded product | | Specific gravity ($\rho$) | g/cm$^3$ | 1.85 | 1.93 | 1.93 | 1.85 | 1.91 |
| | | Bending elastic modulus (E) | Gpa | 26.5 | 30.2 | 31.0 | 26.0 | 26.1 |
| | | X = E/$\rho$ | — | 14.3 | 15.6 | 16.1 | 14.1 | 13.7 |
| | | Resonance frequency | Hz | 254 | 259 | 261 | 250 | 251 |
| | | Productivity | | ○ | ○ | ○ | ○ | ○ |
| | | Bending strength | MPa | 500 | 478 | 469 | 400 | 430 |
| | | Charpy impact value | kJ/m$^2$ | 32 | 37 | 29 | 18 | 20 |
| | | Residual glass fiber length | μm | 360 | 340 | 320 | 280 | 380 |

| | | | | Comparative Example 1 | Comparative Example 2 | Comparative Example 3 | Comparative Example 4 | Comparative Example 5 |
|---|---|---|---|---|---|---|---|---|
| (A) | a1A | Polyamide 6 (RV = 1.9, CEG = 80) | parts by weight | | | | 20 | 20 |
| | a1B | Polyamide 66 (RV = 2.4, CEG = 91) | parts by weight | 3 | 5 | | | 20 |
| | a2A | Polyamide MXD6 (crystalline, RV = 2.1, CEG = 65) | parts by weight | 5 | 35 | | | 30 |
| | a2B | Polyamide MXD6 (crystalline, RV = 1.7, CEG = 35) | parts by weight | 22 | | | | |
| | a2C | Polyamide 6T6I (noncrystalline, RV = 2.0, CEG = 87) | parts by weight | | | 5 | 10 | |
| (B) | b1 | Glass fiber having a flat cross section (flatness degree: 4.0) (cross-sectional area = $1.67 \times 10^{-6}$ to $1.96 \times 10^{-6}$ cm$^2$) | parts by weight | | | | | |
| | b2 | Glass fiber having a flat cross section (flatness degree: 2.5) (cross-sectional area = $1.72 \times 10^{-6}$ to $2.03 \times 10^{-6}$ cm$^2$) | parts by weight | | | | | |
| | b3 | Glass fiber having a circular cross section (cross-sectional area = about $2.27 \times 10^{-6}$ cm$^2$) | parts by weight | | | | | |
| | b4 | Glass fiber having a circular cross section (cross-sectional area = about $9.50 \times 10^{-7}$ cm$^2$) | parts by weight | 70 | 60 | 75 | 60 | 50 |
| (D) | d1 | Copper bromide | parts by weight | | | | | |
| (E) | | Mold-releasing agent | parts by weight | 0.3 | 0.3 | 0.3 | 0.3 | 0.3 |
| | | Stabilizer | parts by weight | 0.1 | 0.1 | 0.1 | 0.1 | 0.1 |
| | | Coupling agent | parts by weight | 0.2 | 0.2 | 0.2 | 0.2 | 0.2 |

TABLE 1-continued

| | | | | | | | |
|---|---|---|---|---|---|---|---|
| Properties of molded product | Specific gravity (ρ) | g/cm³ | — | 1.69 | — | 1.67 | 1.57 |
| | Bending elastic modulus (E) | Gpa | — | 17.5 | — | 16.5 | 14.5 |
| | X = E/ρ | — | — | 10.4 | — | 9.9 | 9.2 |
| | Resonance frequency | Hz | — | 223 | — | 219 | 210 |
| | Productivity | | x | ○ | x | ○ | ○ |
| | Bending strength | MPa | — | 330 | — | 310 | 340 |
| | Charpy impact value | kJ/m² | — | 13 | — | 13 | 14 |
| | Residual glass fiber length | μm | — | 240 | — | 230 | 250 |

TABLE 2

| | | | | Example 6 | Example 7 | Example 8 | Example 9 | Example 10 |
|---|---|---|---|---|---|---|---|---|
| (A) | a1A | Polyamide 6 (RV = 1.9, CEG = 80) | parts by weight | | | | 16 | 16 |
| | a1B | Polyamide 66 (RV = 2.4, CEG = 91) | parts by weight | 4 | 4 | 7 | 4 | 4 |
| | a2A | Polyamide MXD6 (crystalline, RV = 2.1, CEG = 65) | parts by weight | 5 | 5 | 14 | | |
| | a2B | Polyamide MXD6 (crystalline, RV = 1.7, CEG = 35) | parts by weight | 19 | 18 | 7 | | |
| | a2C | Polyamide 6T6I (noncrystalline, RV = 2.0, CEG = 87) | parts by weight | | | | 6 | 6 |
| (B) | b1 | Glass fiber having a flat cross section (flatness degree: 4.0) (cross-sectional area = 1.67 × 10⁻⁶ to 1.96 × 10⁻⁶ cm²) | parts by weight | 71 | 71 | 35 | | 30 |
| | b2 | Glass fiber having a flat cross section (flatness degree: 2.5) (cross-sectional area = 1.72 × 10⁻⁶ to 2.03 × 10⁻⁶ cm²) | parts by weight | | | 35 | | 30 |
| | b3 | Glass fiber having a circular cross section (cross-sectional area = about 2.27 × 10⁻⁶ cm²) | parts by weight | | | | 72 | 12 |
| | b4 | Glass fiber having a circular cross section (cross-sectional area = about 9.50 × 10⁻⁷ cm²) | parts by weight | | | | | |
| (C) | c1 | Carbon black (master base = LDPE resin) | parts by weight | 1 | 2 | | | 2 |
| | c2 | Carbon black (master base = AS resin) | parts by weight | | | 2 | 2 | |
| (D) | d1 | Copper bromide | parts by weight | 0.02 | 0.02 | 0.02 | 0.02 | 0.02 |
| (E) | | Mold-releasing agent | parts by weight | 0.3 | 0.3 | 0.3 | 0.3 | 0.3 |
| | | Stabilizer | parts by weight | 0.1 | 0.1 | 0.1 | 0.1 | 0.1 |
| | | Coupling agent | parts by weight | 0.2 | 0.2 | 0.2 | 0.2 | 0.2 |
| Properties of molded product | | Specific gravity (ρ) | g/cm³ | 1.88 | 1.89 | 1.88 | 1.85 | 1.90 |
| | | Bending elastic modulus (E) | Gpa | 26.8 | 27.6 | 26.1 | 25.8 | 26.0 |
| | | X = E/ρ | — | 14.3 | 14.6 | 13.9 | 13.9 | 13.7 |
| | | Resonance frequency | Hz | 256 | 258 | 255 | 258 | 260 |
| | | Productivity | | ○ | ○ | ○ | ○ | ○ |
| | | Bending strength | MPa | 495 | 458 | 470 | 431 | 444 |
| | | Charpy impact value | kJ/m² | 31 | 29 | 33 | 18 | 25 |
| | | ΔE | | 1.1 | 0.8 | 0.6 | 0.5 | 0.6 |
| | | Residual glass fiber length | μm | 359 | 326 | 360 | 270 | 349 |

| | | | | Comparative Example 6 | Comparative Example 7 | Comparative Example 8 | Comparative Example 9 | Comparative Example 10 |
|---|---|---|---|---|---|---|---|---|
| (A) | a1A | Polyamide 6 (RV = 1.9, CEG = 80) | parts by weight | | | 16 | 29.5 | 28 |
| | a1B | Polyamide 66 (RV = 2.4, CEG = 91) | parts by weight | 5 | 8 | 4 | 10 | 10 |
| | a2A | Polyamide MXD6 (crystalline, RV = 2.1, CEG = 65) | parts by weight | 5 | 8 | | | |
| | a2B | Polyamide MXD6 (crystalline, RV = 1.7, CEG = 35) | parts by weight | 19 | 23.5 | | | |
| | a2C | Polyamide 6T6I (noncrystalline, RV = 2.0, CEG = 87) | parts by weight | | | 6 | 10 | 10 |
| (B) | b1 | Glass fiber having a flat cross section (flatness degree: 4.0) (cross-sectional area = 1.67 × 10⁻⁶ to 1.96 × 10⁻⁶ cm²) | parts by weight | | 60 | | | |
| | b2 | Glass fiber having a flat cross section (flatness degree: 2.5) (cross-sectional area = 1.72 × 10⁻⁶ to 2.03 × 10⁻⁶ cm²) | parts by weight | | | | | |
| | b3 | Glass fiber having a circular cross section (cross-sectional area = about 2.27 × 10⁻⁶ cm²) | parts by weight | | | | | |
| | b4 | Glass fiber having a circular cross section (cross-sectional area = about 9.50 × 10⁻⁷ cm²) | parts by weight | 71 | | 72 | 50 | 50 |

TABLE 2-continued

| | | | | | | | | |
|---|---|---|---|---|---|---|---|---|
| (C) | c1 | Carbon black (master base = LDPE resin) | parts by weight | | 0.5 | | 0.5 | 2 |
| | c2 | Carbon black (master base = AS resin) | parts by weight | | | 2 | | |
| (D) | d1 | Copper bromide | parts by weight | 0.02 | 0.02 | 0.02 | 0.02 | 0.02 |
| (E) | | Mold-releasing agent | parts by weight | 0.3 | 0.3 | 0.3 | 0.3 | 0.3 |
| | | Stabilizer | parts by weight | 0.1 | 0.1 | 0.1 | 0.1 | 0.1 |
| | | Coupling agent | parts by weight | 0.2 | 0.2 | 0.2 | 0.2 | 0.2 |
| Properties of molded product | | Specific gravity ($\rho$) | g/cm$^3$ | — | 1.69 | — | 1.56 | 1.57 |
| | | Bending elastic modulus (E) | Gpa | — | 17.4 | — | 13.5 | 13.7 |
| | | X = E/$\rho$ | — | — | 10.3 | — | 8.7 | 8.7 |
| | | Resonance frequency | Hz | — | 220 | — | 214 | 211 |
| | | Productivity | | x | ○ | x | ○ | ○ |
| | | Bending strength | MPa | — | 345 | — | 320 | 336 |
| | | Charpy impact value | kJ/m$^2$ | — | 14 | — | 13 | 12 |
| | | ΔE | | — | 2.0 | — | 1.8 | 0.6 |
| | | Residual glass fiber length | μm | — | 241 | — | 261 | 249 |

In the table, parts by weight of carbon black are expressed in terms of carbon black pure component.

As will be apparent from Tables 1 and 2, the test pieces of Examples 1 to 5 not only exhibit very high resonance frequency but also are excellent in all of bending strength, bending elastic modulus and Charpy impact strength whereby they are useful as molded products having anti-vibration property. Value of bending elastic modulus against specific gravity (X=E/$\rho$) also shows a high value. In addition to the above, the test pieces of Examples 6 to 10 exhibit excellent weather resistance in view of the value of ΔE. On the contrary, the test pieces of Comparative Examples 1 to 5 are inferior in resonance frequency and in any of evaluating items as compared with the test pieces of Examples 1 to 5. Moreover, the test pieces of Comparative Examples 6 to 10 are inferior in terms of weather resistance in addition to the above.

INDUSTRIAL APPLICABILITY

Due to its very high resonance frequency, a molded product prepared from a polyamide resin composition reinforced with glass fiber in accordance with the present invention has high anti-vibration property and also expresses high levels of bending strength, bending elastic modulus and impact resistance. It is also possible to enhance weather resistance. Accordingly, it is suitable for the cases of electronic/electric instruments such as mobile phones and personal computers and also for automobile parts and is most suitable particularly as parts for holding a mirror for vehicles.

The invention claimed is:

1. A polyamide resin composition reinforced with glass fiber, comprising a polyamide resin (A) constituted from an aliphatic polyamide (a1) and an aromatic component-containing polyamide (a2), and glass fibers (B) having a cross-sectional area of 1.5 to 5.0 ×10$^{-6}$ cm$^2$,
wherein a ratio by weight of the polyamide resin (A) to the glass fibers (B) [(A) : (B)] is from 20:80 to 35:65 and a ratio by weight of the aliphatic polyamide (a1) to the aromatic component-containing polyamide (a2) [(a1) : (a2)] is from 5:95 to 95:5, and
wherein a part of or all of the glass fibers (B) is/are glass fibers having a flat cross section, wherein the glass fibers having a flat cross section consist of glass fibers (B-1) having a flat cross section and having a ratio of short diameter to long diameter of from 0.3 to 0.5, and glass fibers (B-2) having a flat cross section and having a ratio of short diameter to long diameter of from 0.2 to 0.3, wherein a ratio by weight thereof [(B-1) : (B-2)] is from 10:90 to 90:10.

2. The polyamide resin composition reinforced with glass fiber according to claim 1, wherein the composition further comprises carbon black (C) in an amount of at most 5% by weight of the composition.

3. The polyamide resin composition reinforced with glass fiber according to claim 1, wherein the aromatic component-containing polyamide (a2) is crystalline polyamide and the ratio by weight of (a1) to (a2) [(a1) : (a2)] is from 5:95 to 75:25.

4. The polyamide resin composition reinforced with glass fiber according to claim 1, wherein the aromatic component-containing polyamide (a2) contain poly-m-xylylene adipamide which has a relative viscosity in 96% sulfuric acid solution of 1.4 to 1.8 and has a terminal carboxyl group concentration of not higher than 50 meq/kg.

5. The polyamide resin composition reinforced with glass fiber according to claim 1, wherein the aromatic component-containing polyamide (a2) is noncrystalline polyamide and the ratio by weight of (a1) to (a2) [(a1) : (a2)] is from 60:40 to 95:5.

6. The polyamide resin composition reinforced with glass fiber according to claim 1, wherein the composition further comprises a copper compound (D) in an amount of at most 0.5% by weight of the composition.

7. The polyamide resin composition reinforced with glass fiber according to claim 1, wherein the composition further comprises an additive component (E) containing mold-releasing agent, stabilizer and/or coupling agent in an amount of at most 5% by weight of the composition.

8. A molded product formed of the polyamide resin composition reinforced with glass fiber according to claim 1, wherein a specific gravity $\rho$ (g/cm$^3$) of the molded product and a bending elastic modulus E (GPa) of the molded product satisfy formulae: $11 < E/\rho < 18$ and $1.7 < \rho < 2.0$.

9. The molded product according to claim 8, wherein a weight-average length of residual glass fibers in the molded product is 260 to 1000 μm.

10. The molded product according to claim 9, wherein the molded product is used for interior equipment or for exterior equipment of electronic/electric cases or vehicles.

* * * * *